United States Patent [19]
Weber et al.

[11] Patent Number: 5,878,230
[45] Date of Patent: *Mar. 2, 1999

[54] SYSTEM FOR EMAIL MESSAGES WHEREIN THE SENDER DESIGNATES WHETHER THE RECIPIENT REPLIES OR FORWARDS TO ADDRESSES ALSO DESIGNATED BY THE SENDER

[75] Inventors: Owen Weber, Coppell; William Johnson, Flower Mount, both of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 369,024

[22] Filed: Jan. 5, 1995

[51] Int. Cl.⁶ ..................................................... G06F 13/00
[52] U.S. Cl. .............................. 395/200.68; 395/200.75; 379/93.24
[58] Field of Search .................... 395/200.01, 220.02, 395/200.3, 200.4, 200.05, 200.06, 200.2, 200.15, 200.36; 340/827; 364/949.91, DIG. 2

[56] References Cited

U.S. PATENT DOCUMENTS

| | | | |
|---|---|---|---|
| 4,503,499 | 3/1985 | Mason et al. | 364/200 |
| 4,554,418 | 11/1985 | Toy | 179/2 |
| 4,630,196 | 12/1986 | Bednar, Jr. et al. | 395/200.32 |
| 4,827,447 | 5/1989 | Cross et al. | 364/900 |
| 4,932,026 | 6/1990 | Dev et al. | 370/94.1 |
| 4,977,520 | 12/1990 | McGaughey, III et al. | 345/330 |
| 5,105,424 | 4/1992 | Flaig et al. | 395/200.73 |
| 5,113,502 | 5/1992 | Merrill et al. | 395/672 |
| 5,125,075 | 6/1992 | Goodale et al. | 395/200 |
| 5,247,661 | 9/1993 | Hager et al. | 707/104 |
| 5,303,343 | 4/1994 | Ohya et al. | 395/200.76 |
| 5,325,310 | 6/1994 | Johnson et al. | 364/514 |
| 5,333,266 | 7/1994 | Boaz et al. | 395/200 |
| 5,337,360 | 8/1994 | Fischer | 380/23 |
| 5,351,235 | 9/1994 | Lathinen | 370/259 |

*Primary Examiner*—Thomas C. Lee
*Assistant Examiner*—Anderson I. Chen
*Attorney, Agent, or Firm*—Tim Cook; A. Bruce Clay

[57] ABSTRACT

An electronic mail network, comprising a plurality of nodes or computer stations, permits an E-mail message originator to control down stream routing of the message. The system enables the sender of a message to specify which addresses should automatically be set when a recipient of the message replies to or forwards the message.

22 Claims, 4 Drawing Sheets

| MAIL | | | | | | | |
|---|---|---|---|---|---|---|---|
| VIEW | COPY | ADD | DELETE | FIND | SORT | PRINT | SAVE | EXIT |

DATE 12/21/94     INBASKET FOR          JOHN Q. USER

PRESS F2.   THEN CHOOSE ACTION

| SENDER | DESCRIPTION | TYPE | DATE |
|---|---|---|---|
| USER 2 | CONTRACT | DOCUMENT | 12/01/94 |
| USER 10 | DOCUMENT REQUEST | FOLDER | 12/09/94 |
| USER 4 | FINANCIAL CONT'S | DOCUMENT | 12/10/94 |
| USER 1 | DEPARTMENT MEETINGS | MEETING | 12/21/94 |
| USER 9 | AREA BUDGET | BUDGETS | 12/20/94 |

F1 = HELP;    F3 = EXIT    ;F4 = LIST;

*FIG. 2*

| MAIL | | |
|---|---|---|
| REPLY ADDRESSES | FORWARD ADDRESSES | QUIT |

(TEXT)

F1 = HELP;    F3 = EXIT    ;F4 = LIST;

(SENDER MENU)

*FIG. 3*

| MAIL | | |
|---|---|---|
| REPLY ADDRESSES | FORWARD ADDRESSES | QUIT |

(TEXT)

F1 = HELP;    F3 = EXIT    ;F4 = LIST;

(RECIPIENT MENU)

*FIG. 4*

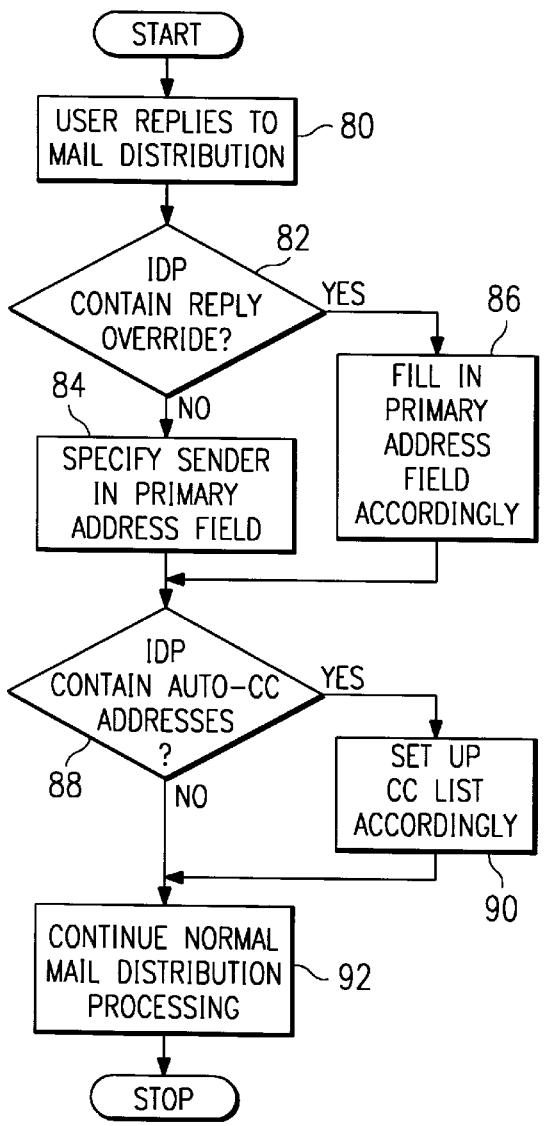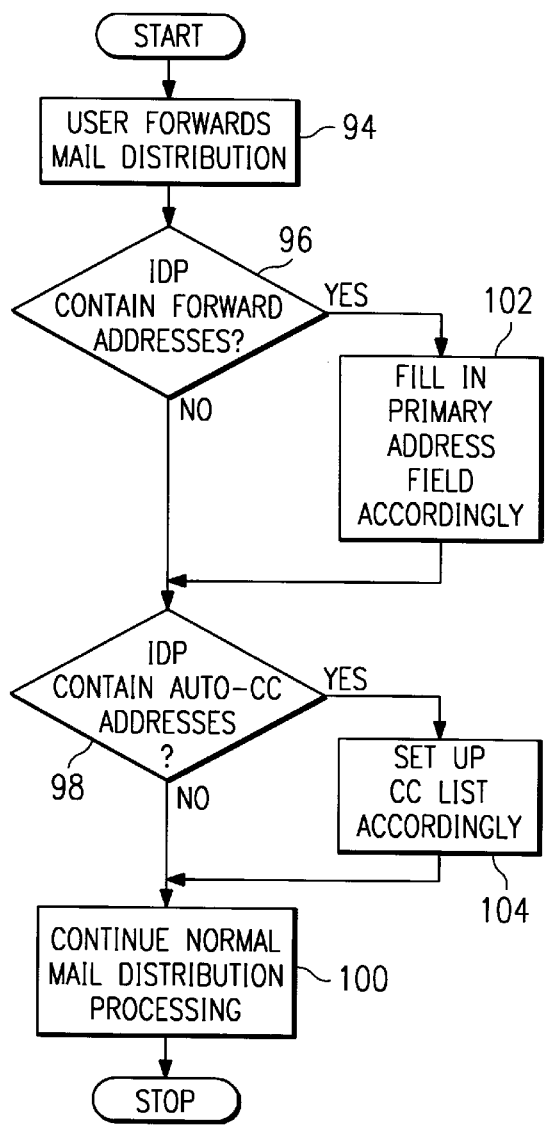

SYSTEM FOR EMAIL MESSAGES WHEREIN THE SENDER DESIGNATES WHETHER THE RECIPIENT REPLIES OR FORWARDS TO ADDRESSES ALSO DESIGNATED BY THE SENDER

FIELD OF THE INVENTION

The present invention relates generally to the field of electronic mail (E-mail) systems and, more particularly, to a method of automatically sending a recipient's E-mail message to a third party.

BACKGROUND OF THE INVENTION

The proliferation of electronic office systems has created a need for exchanging and storing information. One reason for this proliferation is the popularity of E-mail networks. Electronic mail networks permit a network of communicating users to transmit documents (e.g. text, graphics, facsimile, voice, etc.) from one user to another. It is well known in the art that many of the text and word processors used for this purpose are implemented using a family of popular processor chips manufactured and marketed by Intel, Motorola, and others.

When E-mail is sent, the recipient often replies to the note, and the destination address field for the reply is automatically filled in with the address of the originator. However, the originator often wants the recipient to reply to a third party. Thus, a method is needed to allow automatic addressability by the recipient to that third party. As used herein, the term "downstream recipient" refers to any such third party recipient.

An E-mail item generally comprises two essential parts: (1) the content, the information one is trying to communicate to recipients, and (2) attributes, for example in a heading. Attributes includes such things as the identification of recipients, the date the E-mail message was created, time that the message was sent, the sender or originator, a title or name for the message, and other information about the document that the recipient may be interested in. Such attributes are normally sent with the E-mail message as a profile, and may be referred to herein as an Interchange Document Profile (IDP).

In the past, the Interchange Document Profile that has been provided by all vendors has failed to provide a capability for an originator to dictate subsequent routing for any document sent. Carbon copy recipients have been specified but this falls short of providing multi-stage routing. Thus, there remains a need for a method and system for automatic routing of electronic mail to sender-selectable third parties.

SUMMARY OF THE INVENTION

The present invention enables the originator of an E-mail distribution to specify one or more recipients in a reply address field as the destination whenever the recipient replies to the note. For example, User A sends a note to User B and designates User C in the reply address field. In the note, User A asks User B to reply with an answer to the Purchasing Department (User C). User B reads the note, then selects the reply function. The system then automatically fills in the reply destination address field with User C, since User A knew that User C was the appropriate contact in Purchasing.

The present invention further provides the ability to prevent a FORWARD or RESEND option thereby making a REPLY the only available option that can be selected by a recipient. An originator of a message may also specify a set of recipients in a desired recipient list (e.g., COPYLIST, PRIMARY RECIPIENT LIST, BLIND COPY LIST, etc.) depending on the option (e.g., FORWARD, RESEND, REPLY) that a recipient performs. Thus, the IDP automatically fills a (third-party) recipient list that is contingent upon the routing option selected by a recipient.

In addition, the originator may automatically be included in the reply address field, as well as a third party addressee. Any valid address or distribution list may be used in the reply address field.

The present invention is equally applicable to a telephone environment, where User A leaves a message on User B's phone system, etc.

These and other objects and features of the present invention will be immediately apparent to those of skill in the art.

BRIEF DESCRIPTION OF THE DRAWINGS

For a more complete understanding of the present invention and the features and advantages thereof, reference is now made to the Detailed Description in conjunction with the attached Drawings, in which:

FIG. 2 depicts a display screen or window called up by a user when he wishes to review the messages in his E-mail In Basket.

FIG. 3 illustrates an example of a display screen or window presented to an originator of an E-mail message.

FIG. 4 illustrates an example of a display screen or window presented to a recipient of an E-mail message.

FIG. 6 is a logic flow diagram for outgoing mail distribution for specifying a reply to the sender's message.

FIG. 7 is a logic flow diagram for outgoing mail distribution for specifying the Forward option.

DETAILED DESCRIPTION OF A PREFERRED EMBODIMENT

Figure 1:
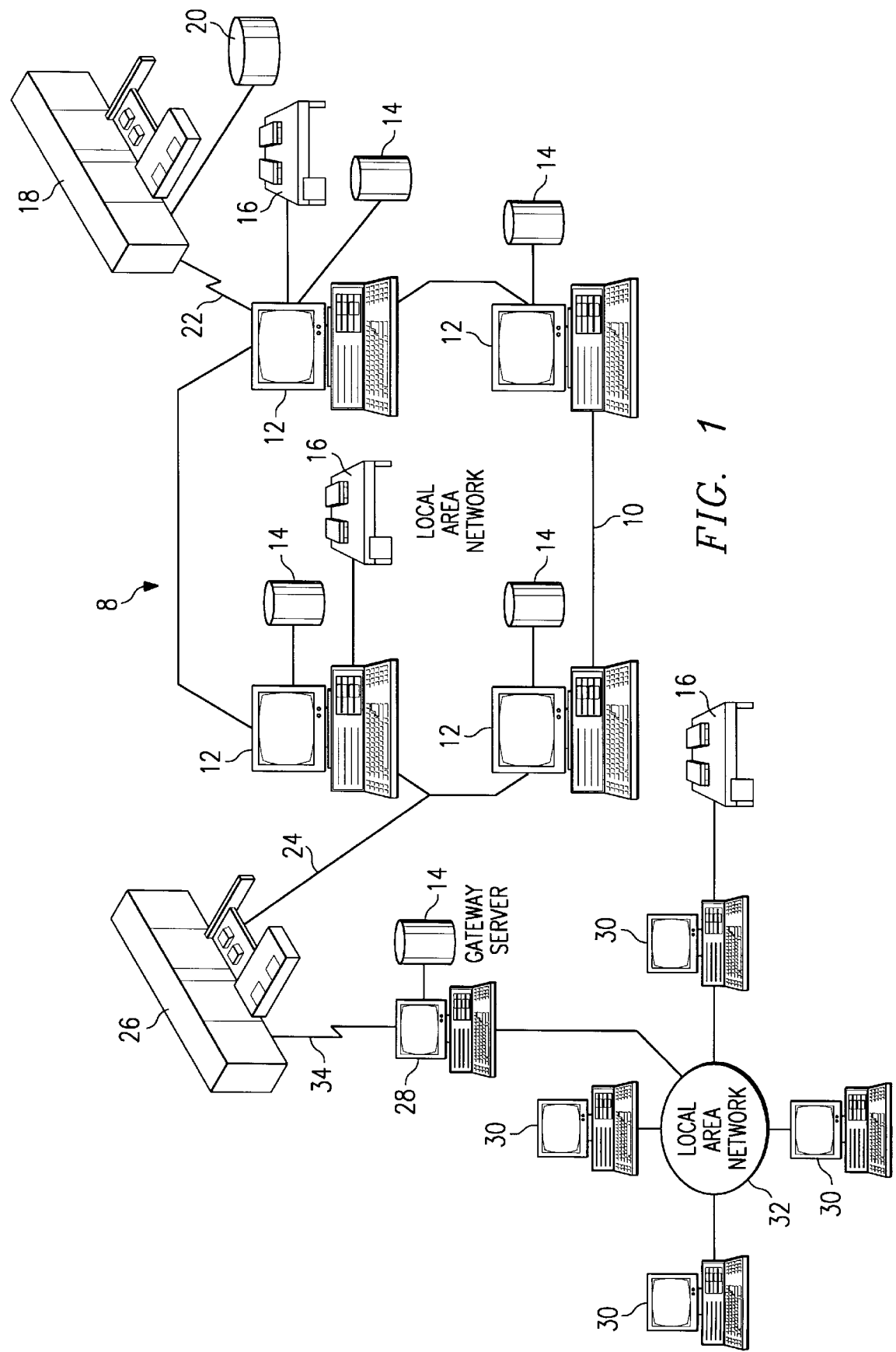
FIG. 1 is a schematic diagram of a network system in which the present invention may find application.

With reference now to the figures, and in particular with reference to FIG. 1, there is depicted a pictorial representation of a data processing system 8 which may be used to implement the present invention. The data processing system 8 may include a plurality of networks, such as Local Area Networks (LAN) 10 and 32, each of which preferably includes a plurality of individual computers or computer stations 12 and 30, respectively. A plurality of Interactive Work Stations (IWS) coupled to a host processor may be used for each such network.

As is common in such data processing systems, each individual computer may be coupled to a storage device 14 and/or a printer/output device 16. One or more such storage devices 14 may be used, in accordance with the method of the present invention, to store applications or resource objects which may be periodically accessed by any user within data processing system 8. In a manner well known in the art, each such application or resource object stored within a storage device 14 is associated with a Resource Manager, which is responsible for maintaining and updating all resource objects associated with the Resource Manager.

The data processing system 8 may also include multiple main frame computers, such as a main frame computer 18, which may be preferably coupled to Local Area Network (LAN) 10 by means of communications link 22. The main frame computer 18 may also be coupled to a storage device 20 which may serve as remote storage for LAN 10. Similarly, LAN 10 may be coupled via a communications link 24 through a subsystem control unit/communication controller 26 and a communications line 34 to a gateway server 28. The gateway server 28 is preferably an individual computer or Interactive Work Station (IWS) which serves to link LAN 32 to LAN 10.

As discussed above with respect to LAN 32 and LAN 10, resource objects may be stored within storage device 20 and controlled by the main frame computer 18, as resource manager for the resource objects thus stored. Those skilled in the art will appreciate that the main frame computer 18 may be located a great geographic distance from LAN 10 and similarly LAN 10 may be located a substantial distance from LAN 32. That is, LAN 32 may be located in California while LAN 10 may be located with Texas and main frame computer 18 may be located in New York.

In known prior systems, when a user at an individual computer 12 or 30 (the sender or originator) composes an E-mail for distribution to one or more other individual computers 12 or 30 (the recipient(s)), the E-mail system automatically generates a reply attribute that dictates that reply to the original message will be directed to the sender or originator. However, this is not always the wish of the sender. Indeed, the sender may want to direct responses to the E-mail message to a variety of third-party recipients. The present invention provides such a capability.

Any party on an E-mail network may at any time request to see the list of electronic documents that are in his In Basket. FIG. 2 depicts an example of the type of list that would be presented upon such a request. As shown, the list comprises four columns. The first column identifies the sender. The second column identifies the document label or a short description of the document. The third column defines the document type while the last column lists the date of the document.

The last line on the screen lists the functions of the function keys as a reminder to the terminal user. The second row of the screen lists the various options that are available to the end user when the screen is displayed. For example, a user may view a selected document by moving a horizontal highlighting bar on the screen to the line listing the desired document and then typing V, the first letter of the View command.

FIG. 3 shows an example of a menu presented to a sender in setting up the IDP and the text of the message that he wishes to send. FIG. 4 depicts an example of a similar menu presented to a recipient of such a message.

Figure 5:
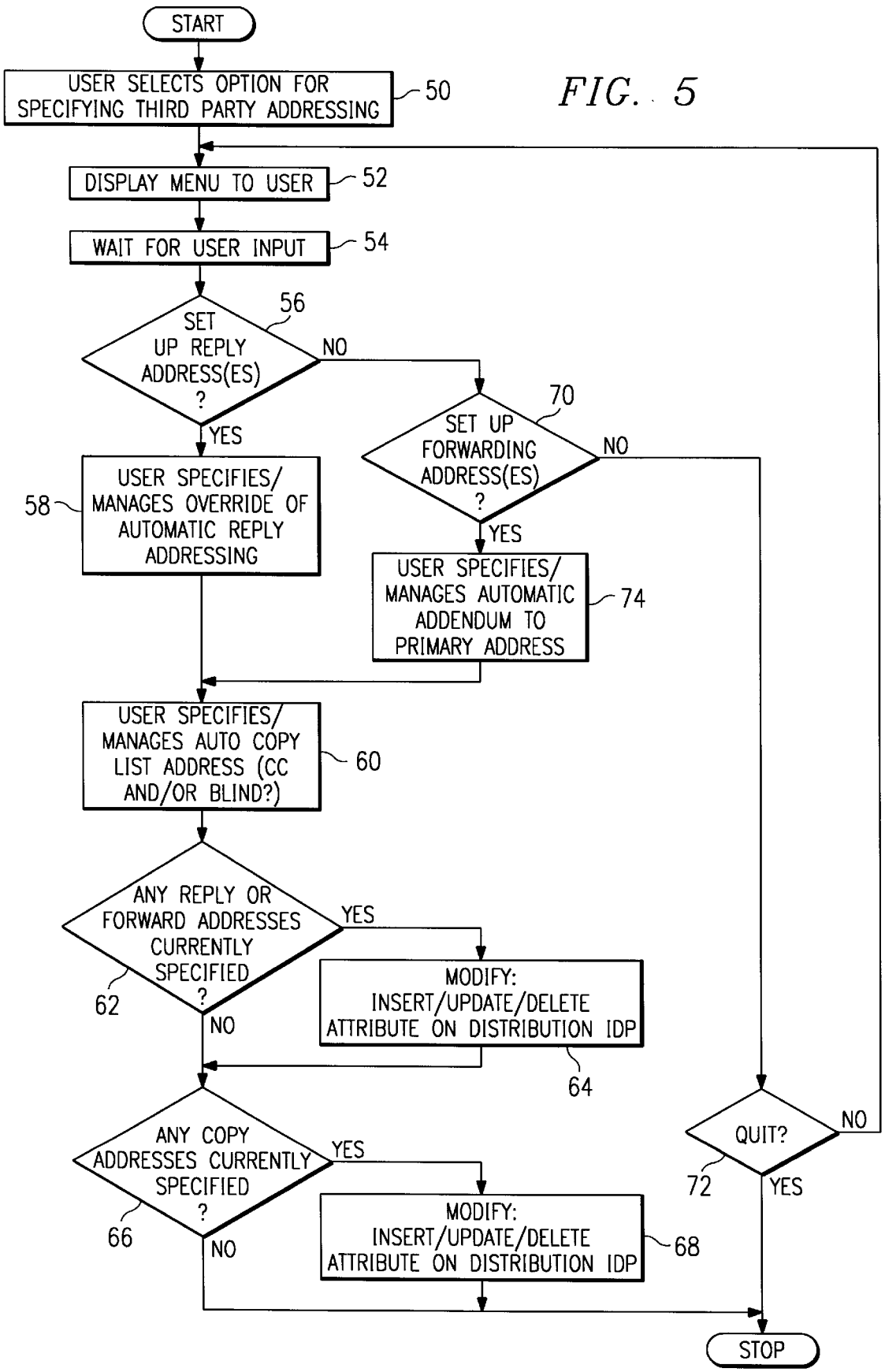
FIG. 5 is a logic flow diagram for the method of outgoing mail distribution for specifying third party addressing in accordance with the present invention.

FIG. 5 depicts the presently preferred logic flow for setting up the profile information so that when a message arrives at the recipient's In Basket it behaves correctly. FIG. 6 depicts logic flow when a recipient has opted to Reply to the distribution. Finally, FIG. 5 similarly depicts the logic flow of the present invention when a recipient selects the Forward option. Together, the method depicted in FIGS. 5, 6, and 7 permit a sender to specify addresses that will automatically appear should the recipient resend, forward, or reply to the message or note that is sent and automatically makes addresses appear in the right places.

As used herein, the term "reply" is used to refer to the process of answering an E-mail message in which the message being answered is not retained with the answer. In other words, a recipient prepares a reply and this reply is all that the subsequent recipients receive. In contrast, as used herein the term "forward" is used to refer to the process of answering an E-mail message in which the message being answered is retained intact with the text prepared by the recipient. In other words, third party recipients (or the original sender) receives the original message as well as the first recipient's text together. Finally, as used herein, the term "resend" not only includes the originator's text and the recipient's text, but it keeps all messages appended to it (not just the message immediately preceding it), and it permits the editing of the text of the entire message string, as well.

Now referring to FIG. 5, a user selects the option for specifying third party addressing in step 50. Once third party addressing is selected, the system displays the menu to the user in step 52. If the user does not opt to select third party addressing, the system proceeds as in the prior art for any response from the recipient.

Once third-party addressing is selected, the menu displays three options, as shown in FIG. 3, including Reply Addresses, Forwarding Addresses, or Quit. The interface demonstrated by FIG. 3 may have been arrived by a variety of well known methods when interfacing to FIG. 2. FIG. 3 only demonstrates the interface of subject to the present invention. Other options and/or controls may have been integrated with FIG. 3 in a particular mail system.

At this point, the system must wait for user input in step 54. If the user opts to set up reply addresses in step 56, the user next specifies/manages the receiving system's override of automatic reply addressing in step 58. The user may specify individual explicit addresses, nicknames later resolved to addresses, or distribution lists. Distribution lists may include, for example, all managers at a particular level in a business organization, or members of a particular task force to which the message pertains. Then, the user is provided with the opportunity to specify some automatic copy addresses in step 60. This is another feature of the present invention, in which the originator is provided with the opportunity to select a previously prepared list of recipients in the third party addressing mode, which will depend on actions of the recipient of the message.

Next, the system in step 62 determines if any addresses are currently specified. If the user has so specified, that IDP attribute is automatically placed on the mail item. Then, if addresses have been specified, the user (originator) is then given the opportunity, if he chooses, to tailor the address list or modify any attribute in the IDP in step 64.

If no reply or forwarding addresses have been specified, the process continues with step 66 to determine if any copy addresses (which require no action by a recipient) have been specified. If any copy addresses have been specified, the system provides the user to modify any attribute on the distribution IDP in step 68. When this is complete (if any) or if no addresses have been specified, the process is done.

Returning to step 56, if the user does not select any reply addresses, he is asked to set up forwarding addresses in step 70. If he has none, the process offers the option to quit in step 72. If the user is not ready to proceed with drafting and sending a message (i.e., he may wish to further specify routing of the message), then the menu of FIG. 3 is once more displayed in step 52. Otherwise the process terminates. If the user chooses to set up forwarding addresses, then step 74 provides the user the opportunity to specify/manage the receiving system's override of automatic forward or resend addressing. Resend is a form of forwarding. The process then continues with step 60 as previously described.

In summary, the process of the present invention as shown in FIG. 5 sets up attributes on the IDP so that when the mail item is received, it will behave correctly, enabling the recipient with an automatically set recipient list for subsequent sending of the mail item.

FIG. 6 depicts the logic flow for the method of the present invention at the recipient's station if the IDP directs the Reply function. The recipient has received a mail item. He calls up the window depicted in FIG. 2, reads the mail item, and determines that the message calls for a reply. In known systems, the sender's (originator's) address automatically gets plugged into the "reply to" field in the IDP. In such a system, the recipient drafts a reply and, when he sends it, the message automatically gets routed back to the originator.

In the present invention, once a user has determined that a message requires a reply in step 80, the process in step 82 checks the IDP to see if it has the "reply to" override (selected by a sender in step 50, FIG. 5). If the sender did not select third party addressing, the process continues in step 84 as in the prior art previously described. The process simply specifies the sender as the primary address field. If the IDP indicates third party addressing (i.e., reply override), the process in step 86 automatically updates the IDP to place the addresses specified by the original sender as the primary address field. Visual confirmation of changes is presented to the user. The process next checks the IDP again to detect specified open or blind copy address in step 88. If so, process automatically updates the IDP in step 90 to set up the list of copy addresses. Visual confirmation of changes is presented to the user. Finally, the process continues in step 92 with E-mail distribution with the third party routing seamlessly handled by the present invention.

As previously described, the Reply function does not relay any of the text from the originator's message. However, in the Forward function shown in FIG. 7, the original message is kept and new text is added to it. The Forward function depicted in FIG. 7 also shows the logic flow for the Resend function, since Resend is considered an editable form of forwarding.

The logic flow depicted in FIG. 7 is similar to the logic flow of FIG. 6. As before, the user in step 94 determines that the Forward function is called for. Steps 96 and 98 check the IDP for specified addresses and steps 102 and 104 automatically fill in the fields in the IDP appropriately as previously specified by the user in FIG. 5.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of routing a message in an electronic mail system from a sender to a first recipient and then to a reply recipient, the method comprising the steps of:
   a. displaying to the sender, in a window on a display screen, a menu including a plurality of user selectable action items, each action item representing a function;
   b. displaying in the window to the sender a user selectable function defining at least one reply address of a first recipient;
   c. displaying in the window to the sender a user selectable function defining at least one forwarding address of a reply recipient;
   d. providing to the sender the option of selecting between reply addresses and forwarding addresses to designate whether the first recipient is to reply or forward the message; and
   e. designating by the sender at least one address of a reply recipient.

2. The method of claim 1 further comprising the steps of:
   a. transmitting a message from the sender to the first recipient and
   b. automatically directing a response to the message from the first recipient to the sender.

3. The method of claim 1 further comprising the steps of:
   a. transmitting a message from the sender to the first recipient and
   b. automatically directing a response to the message from the first recipient to the reply recipient.

4. The method of claim 3 further comprising the step of providing to the first recipient the opportunity to edit the message from the sender.

5. An electronic mail system comprising:
   a. a plurality of computer stations coupled through a communication network; and
   b. an operating system for control of electronic mail from one of the plurality of computer stations, the operating system including originator selectable means of sending a message from the originator to a recipient, the operating system further including originator selectable means of specifying the automatic relay of the message from the recipient to a computer station other than that of the originator without action from the recipient, specifying whether the recipient is to reply to or forward the message, and specifying the address of the computer station other than that of the originator.

6. The system of claim 5 further comprising means for directing that a response by a recipient be automatically routed to the originator.

7. The system of claim 5 further comprising means for directing that a response by a recipient be automatically forwarded to a list of third-party recipients selected by the originator, the response by the recipient including the message sent by the originator.

8. The system of claim 7 further comprising means for editing originator's message by the recipient.

9. The system of claim 5 further comprising means for directing a message to a preselected copy list.

10. The system of claim 9 further comprising means for editing the preselected copy list.

11. In a data processing system, a method of electronic mail routing comprising the steps of enabling the generation of a mail distribution by a sender to a first recipient and allowing the sender of the mail distribution to specify one or more reply recipients downstream of the first recipient, and allowing the sender to specify whether the first recipient is to replay to or forward the electronic mail.

12. The method of claim 11 wherein the reply recipients comprise copy-list recipients.

13. The method of claim 11 wherein the reply recipients comprise primary address recipients.

14. The method of claim 11 further comprising the step of automatically filling in the addresses of reply recipients upon generation of a reply to the distribution by the first recipient.

15. The method of claim 11 further comprising the step of automatically filling in the addresses of reply recipients upon generation of a forward to the distribution by the first recipient.

16. The method of claim 11 further comprising the step of automatically filling in the addresses of reply recipients upon generation of a resend to the distribution by the first recipient.

17. An electronic mail subsystem in a data processing system comprising means for generating a mail distribution by a sender to a first recipient and means for specifying the automatic relay of the mail distribution to one or more downstream recipients from the first recipient without intervention from the first recipient, specifying whether the first recipient is to reply to or forward the message, and specifying the address of the downstream recipient.

18. The electronic mail subsystem of claim 17 wherein the downstream recipients comprise copy-list recipients.

19. The electronic mail subsystem of claim 17 wherein the downstream recipients comprise primary address recipients.

20. The electronic mail subsystem of claim 17 further comprising means for automatically filling in the addresses of downstream recipients upon generation of a reply to the distribution.

21. The electronic mail subsystem of claim 17 further comprising means for automatically filling in the addresses of downstream recipients upon generation of a forward to the distribution.

22. The electronic mail subsystem of claim 17 further comprising means for automatically filling in the addresses of downstream recipients upon generation of a resend to the distribution.

* * * * *